(12) United States Patent
Schmit

(10) Patent No.: US 7,263,602 B2
(45) Date of Patent: Aug. 28, 2007

(54) PROGRAMMABLE PIPELINE FABRIC UTILIZING PARTIALLY GLOBAL CONFIGURATION BUSES

(75) Inventor: Herman Schmit, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 714 days.

(21) Appl. No.: 10/222,645

(22) Filed: Aug. 16, 2002

(65) Prior Publication Data

US 2004/0034761 A1 Feb. 19, 2004

(51) Int. Cl.
  *G06F 15/80* (2006.01)
  *G06F 15/177* (2006.01)

(52) U.S. Cl. ........................................ 712/227; 712/11

(58) Field of Classification Search ................ 712/227, 712/11, 35
See application file for complete search history.

(56) References Cited

U.S. PATENT DOCUMENTS

| | | | | |
|---|---|---|---|---|
| 5,684,980 A | * | 11/1997 | Casselman .................... | 703/23 |
| 5,740,463 A | * | 4/1998 | Oshima et al. ................ | 712/11 |
| 6,038,350 A | * | 3/2000 | Iwase et al. ................ | 382/304 |
| 6,182,206 B1 | * | 1/2001 | Baxter .......................... | 712/43 |
| 6,272,621 B1 | * | 8/2001 | Key et al. .................... | 712/200 |
| 6,442,732 B1 | * | 8/2002 | Abramovici et al. ............ | 716/4 |
| 6,470,441 B1 | * | 10/2002 | Pechanek et al. .............. | 712/15 |
| 6,526,559 B2 | * | 2/2003 | Schiefele et al. .............. | 716/16 |
| 6,769,056 B2 | * | 7/2004 | Barry et al. .................... | 712/15 |
| 6,959,378 B2 | * | 10/2005 | Nickolls et al. ............. | 712/229 |

OTHER PUBLICATIONS

Goldstein, S. C., et al., "PipeRench: A Coprocessor for Streaming Multimedia Acceleration", pp. 1-12, School of Computer Science and Dept. of ECE, Carnegie Mellon University, Pittsburgh, Pennsylvania.

Schmit, H., et al., "PipeRench: A Virtualized Programmable Datapath in 0.18 Micron Technology", pp. 1-4, Department of Electrical and Computer Engineering, Carnegie Mellon University, Pittsburgh, Pennsylvania.

(Continued)

Primary Examiner—Eric Coleman
(74) Attorney, Agent, or Firm—Jones Day; Edward L. Pencoske

(57) ABSTRACT

A method of associating virtual stripes to physical stripes in a pipelined or ring structure comprises associating a first set of virtual stripes with at least two physical stripes and associating a second set of virtual stripes, disjoint from the first set, with at least two additional physical stripes. The present invention is also directed to a method of configuring a plurality of processing elements based on a less than global, but not purely local, association. The configuration method of the present invention may be implemented in a device arranged in stripes of processing elements. The method comprises configuring either of at least two physical stripes with a virtual stripe from a first set of virtual stripes and configuring either of at least two additional physical stripes with a virtual stripe from a second set of virtual stripes, said first and second virtual sets being disjoint. The present invention is also directed to a reconfigurable device comprising a controller, a memory device responsive to the controller, a plurality of processing elements arranged in stripes, a plurality of intra-stripe interconnections for connecting processing elements within a stripe, a plurality of local inter-stripe connections for connecting the output of one stripe to the input of one and only one other stripe, a plurality of global inter-stripe connections for connecting at least one but less than all of the physical stripes to the memory, and an input bus and an output bus, each connected to at least one physical stripe.

10 Claims, 5 Drawing Sheets

OTHER PUBLICATIONS

Schmit, H., "Incremental Reconfiguration for Pipelined Applications", pp. 1-9, Dept. of ECE, Carnegie Mellon University, Pittsburgh Pennsylvania.

Cadambi, S., et al., "Managing Pipeline-Reconfigurable FPGAs", pp. 1-10, Carnegie Mellon University, Pittsburgh, Pennsylvania.

Goldstein, S.C., et al., "PipeRench: A Reconfigurable Architecture and Compiler", COMPUTER, Apr. 2000, pp. 70-77, IEEE.

Seth Copen Goldstein, Herman Schmit, Matthew Moe, Mihai Budiu, Srihari Cadambi, R. Reed Taylor and Ronald Laufer, PipeRench: A Coprocessor for Streaming Multimedia Acceleration, School of Comptuer Science and Department of ECE, Carnegie Mellon University, Pittsburgh, PA, 1999, pp. 28-39, XP-000887607.

Herman Schmit, Incremental reconfiguration for Pipelined Applications, Dept. of ECE, Carnegie Mellon University, Pittsburgh, PA, 1997, pp. 47-55.

Herman H. Schmit, Srihari Cadambi and Matthew Moe, Pipeline Reconfigurable FPGAs, Department of Electrical and Computer Engineering, Carnegie Mellon University, Pittsburgh.

* cited by examiner

PROGRAMMABLE PIPELINE FABRIC UTILIZING PARTIALLY GLOBAL CONFIGURATION BUSES

STATEMENT REGARDING FEDERALLY SPONSORED RESEARCH

This invention was developed in part through funding provided by DARPA-ITO/TTO under contract No. DABT63-96-C-0083. The federal government may have rights in this invention.

BACKGROUND OF THE INVENTION

1. Field of the Invention

The present invention is related to reconfigurable architectures and, more particularly, to reconfigurable architectures used to process information in a pipelined fashion.

2. Description of the Background

Traditional approaches to reconfigurable computing statically configure programmable hardware to perform a user-defined application. The static nature of such a configuration causes two significant problems: a computation may require more hardware than is available, and a single hardware design cannot exploit the additional resources that will inevitably become available in future process generations. A technique called pipelined reconfiguration implements a large logical configuration on a small piece of hardware through rapid reconfiguration of that hardware. With this technique, the compiler is no long responsible for satisfying fixed hardware constraints. In addition, a design's performance improves in proportion to the amount of hardware allocated to that design.

Pipelined configuration involves virtualizing pipelined computations by breaking a single static configuration into pieces that correspond to pipeline stages in the application. Each pipeline stage is loaded, one per cycle, into the fabric. This makes performing the computation possible, even if the entire configuration is never present in the fabric at one time.

FIG. 1 illustrates the virtualization process, showing a five-stage pipeline virtualized on a three-stage fabric. FIG. 1A shows the five-stage application and each logical (or virtual) pipeline stage's state in six consecutive cycles. FIG. 1B shows the state of the physical stages in the fabric as it executes this application. In this example, virtual pipe stage 1 is configured in cycle 1 and ready to execute in the next cycle; it executes for two cycles. There is no physical pipe stage 4; therefore, in cycle 4, the fourth virtual pipe stage is configured in physical pipe stage 1, replacing the first virtual stage. Once the pipeline is full, every five cycles generates two results for two consecutive cycles. For example, cycles 2, 3, 7, 8 . . . consume inputs and cycles 6, 7, 11, 12, . . . generate outputs.

FIG. 2 is an abstract view of the architectural class of a pipelined fabric. Each row of processing elements (PEs) together with its associated interconnections is referred to as a stripe. Each PE typically contains an arithmetic logic unit (ALU) and a pass register file. Each ALU contains lookup tables (LUTs) and extra circuitry for carry chains, zero detection, and so on. Designers implement combinational logic using a set of N B-bit-wide ALUs. The ALU operation is static while a particular virtual stripe resides in a physical stripe. Designers can cascade, chain or otherwise connect the carry lines of the ALUs to construct wider ALUs, and chain PEs together via an interconnection network to build complex combinational functions.

Because reconfigurable fabrics provide an opportunity to carry out a process in a fabric having fewer physical stripes than the process requires, it is necessary to associate the virtual stripes to the physical stripes. FIG. 3 illustrates a global association option in which any virtual stripe can be loaded into any physical stripe. Global association provides an advantage in that storage is consolidated saving on memory overhead. However, a substantial disadvantage is that the design is not scalable. As the number of physical stripes increases, the global bus lines become long and highly-loaded. Thus, although global association may work well in fabrics having small numbers of physical stages, as hardware improves and the number of physical stages is increased, associating each physical stripe with any virtual stripe becomes less and less desirable.

Turning to FIG. 4, a purely local association option is illustrated. As seen in FIG. 4, physical stripe 1 can be configured with virtual stripes 0 and 4. Physical stripe 2 can be configured with virtual stripes 1 or 5. Physical stripe 3 can be configured with virtual stripes 2 or 6 while physical stripe 4 can be associated with virtual stripes 3 or 7. Like FIG. 3, there are still four physical and eight virtual stripes. The local association illustrated in FIG. 4 overcomes the disadvantage of global association of FIG. 3 in that the association option of FIG. 4 is scalable due to short and lightly-loaded configuration buses. The local association option illustrated in FIG. 4 is also faster than the global association option due to smaller memories and the ability to interleave the access to those memories, thus allowing the memory to cycle more slowly than the fabric. The local association of FIG. 4, however, has some disadvantages in that the storage is highly distributed and therefore inefficient because of the overhead necessary for operation of the distributed storage.

Additional buses must be provided to have an operational device. For example, input and output buses must be provided. Typically, such input and output buses are global in that they service each of the physical stripes. However, if the input and output buses are less than global, it is necessary to insure during the design phase that a physical stripe that is not serviced by the input bus will not be required to be the first physical stage and that a physical stripe not serviced by the output bus will not be required to be the last physical stage. Finally, it may be necessary for some value produced by a physical stripe to be used in the next instance of that physical stripe. In that case, the value must be taken from the physical stripe, stored in memory, and input (restored) to that or another physical stripe when the next instance of that stripe occurs. If the bus providing that function is less than global, it is necessary during the design phase to insure that a physical stripe that is not serviced by the restore bus will not be required to provide or receive such a value.

Thus, the need exists for an association option which maintains the advantages of global association while at the same time being scalable, is capable of providing state information to stripes as needed, and is capable of outputting information even when the output stripe is not serviced by an output bus.

SUMMARY OF THE PRESENT INVENTION

The present invention is directed to a method of associating virtual stripes with physical stripes in a device of the type wherein the physical stripes may be connected in a pipelined or ring structure. The method comprises associating a first set of virtual stripes with any one of at least two physical stripes and associating a second set of virtual stripes, different from the first set of virtual stripes, to any one of at least two additional physical stripes. The present invention is also directed to a method of configuring a plurality of processing elements based on a less than global, but not purely local, association. The configuration method of the present invention may be implemented in a device arranged in stripes of processing elements and interconnected in a ring or pipelined manner. The method comprises configuring either of at least two physical stripes with a stripe from a first set of virtual stripes and configuring either of at least two additional physical stripes with a stripe from a second set of virtual stripes, the first and second sets of virtual stripes being disjoint.

In a device implementing the method of the present invention, it is possible that the output bus may not interconnect all of the physical stripes. If that is the case, and the final output is not available at a physical stripe serviced by the output bus, it is necessary to configure one or more physical stripes with a null configuration. The null configuration enables the final output to propagate, unchanged, through the physical stripe. As many physical stripes as are necessary can be configured with the null configuration to enable the final output to be available at a physical stripe serviced by the output bus.

The present invention is also directed to a reconfigurable device comprising a controller, a memory device responsive to the controller, a plurality of processing elements arranged in stripes, a plurality of intra-stripe interconnections for connecting processing elements within a stripe, a plurality of local inter-stripe connections for connecting the output of one stripe to the input of one and only one other stripe, a plurality of global inter-stripe connections for connecting at least one but less than all of the physical stripes to the memory, and an input bus and an output bus, each connected to at least one physical stripe.

The method and apparatus of the present invention provide for lightly loaded, partially global buses, efficient use of memory, and a scalable architecture, not only in terms of associating virtual stripes with physical stripes, but also efficiently using input, output and restore buses. Those advantages and benefits, and others, will be apparent from the Detailed Description of the Invention herein below.

BRIEF DESCRIPTION OF THE DRAWINGS

For the present invention to be easily understood and readily practiced, the present invention will now be described, for purposes of illustration and not limitation, in conjunction with the following figures, wherein.

DETAILED DESCRIPTION OF THE INVENTION

Figure 5:
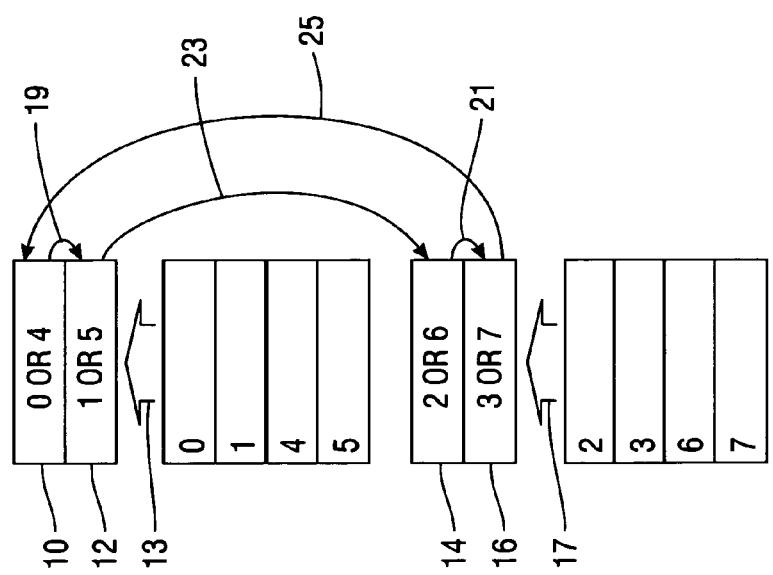
FIG. 5 illustrates a hybrid association option according to the teachings of the present invention.

FIG. 5 illustrates a hybrid association option according to the teachings of the present invention. In FIG. 5, it is seen that virtual stripes 0, 1, 4, 5 may be configured in physical stripes 10, 12. More specifically, virtual stripes 0 and 4 may be configured in physical stripe 10 while virtual stripes 1 and 5 may be configured in physical stripe 12. A partially global bus 13 may be used to transfer the information needed to configure a physical stripe with a virtual stripe.

In a similar manner, a physical stripe 14 may be configured with virtual stripes 2 and 6 while a physical stripe 16 may be configured with virtual stripes 3 and 7 by operation of a partially global bus 17. As illustrated in FIG. 5, the method of the present invention allows the association of a first set of virtual stripes 0, 1, 4, 5 to at least two physical stripes 10, 12 while associating a second set of virtual stripes 2, 3, 6, 7 to at least two additional physical stripes 14, 16.

It is also seen from FIG. 5 that pass register wires 19 provide local inter-stripe connections between physical stripes 10 and 12 while pass register wires 21 provide local inter-stripe connections between physical stripes 14 and 16. Pass register wires 23 provide local inter-stripe connections between physical stripes 12 and 14 while pass register wires 25 provide local inter-stripe connections between physical stripes 16 and 10. Although the association method of the present invention has been illustrated in connection with four physical stripes and eight virtual stripes, those of ordinary skill in the art will recognize that the method of the present invention may be extended to much larger systems while still embracing the concept of utilizing partially-global buses.

Figure 1A:
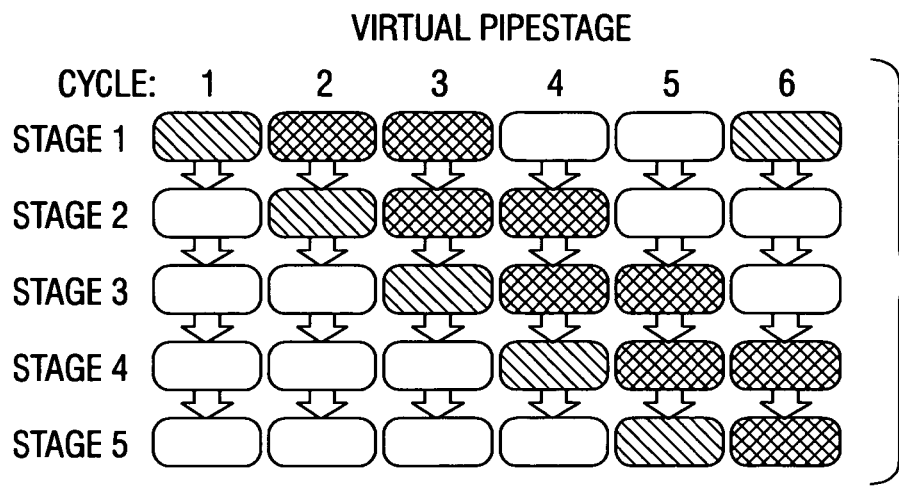
FIGS. 1A and 1B illustrate the process of virtualizing a five-stage pipeline on a three stage reconfigurable fabric.
Figure 1B:
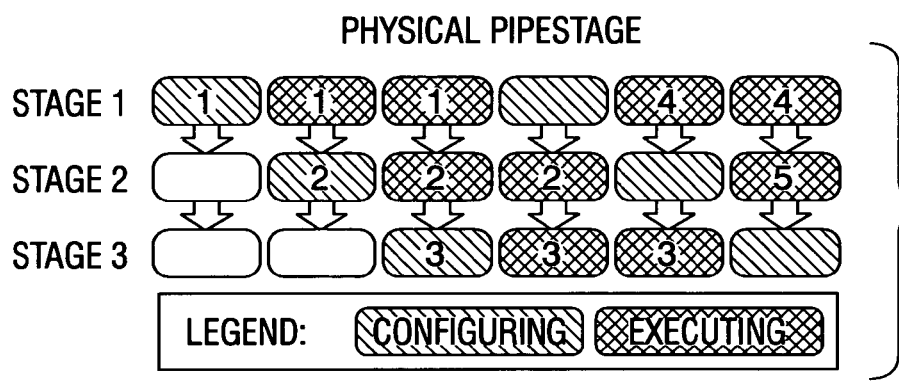
Figure 2:
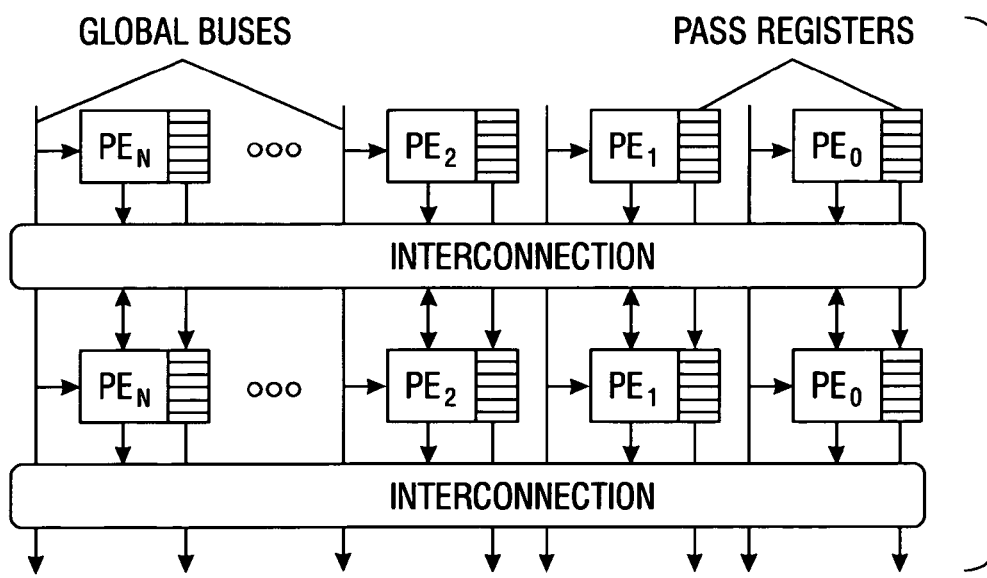
FIG. 2 illustrates a stripe of a reconfigurable fabric.
Figure 4:
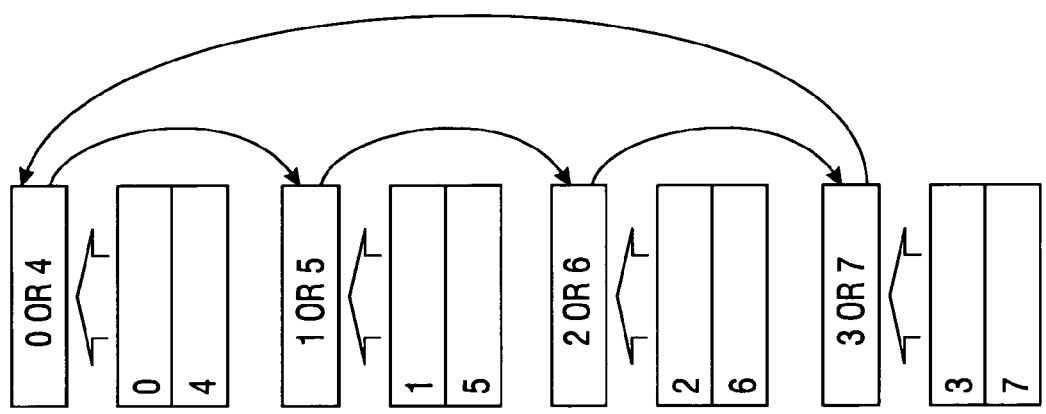
FIGS. 3 and 4 illustrate global mapping and local association options, respectively.
Figure 3:
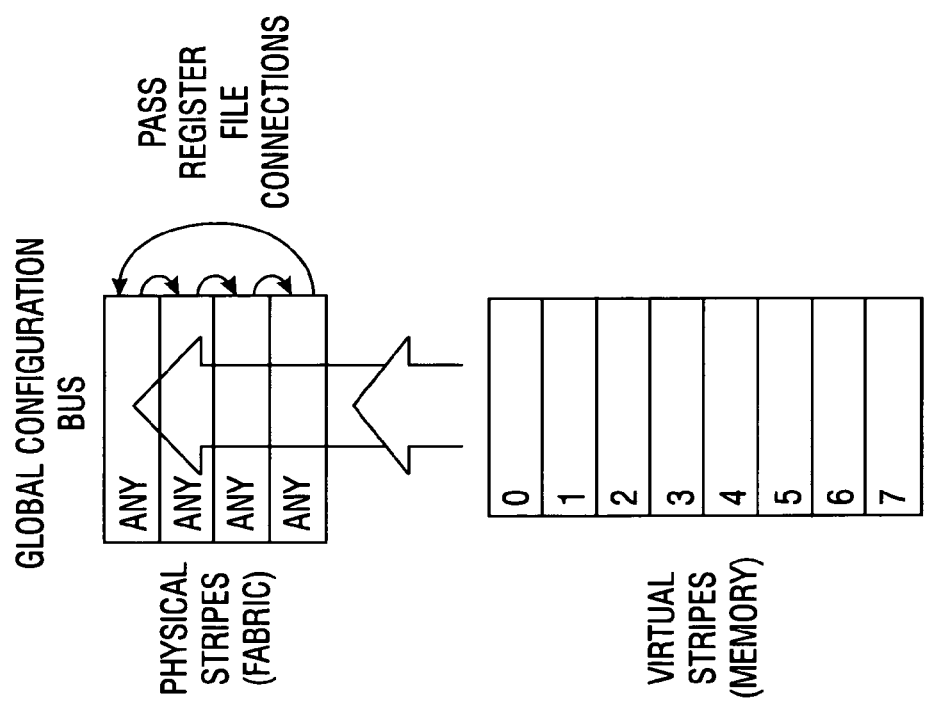
Figure 6:
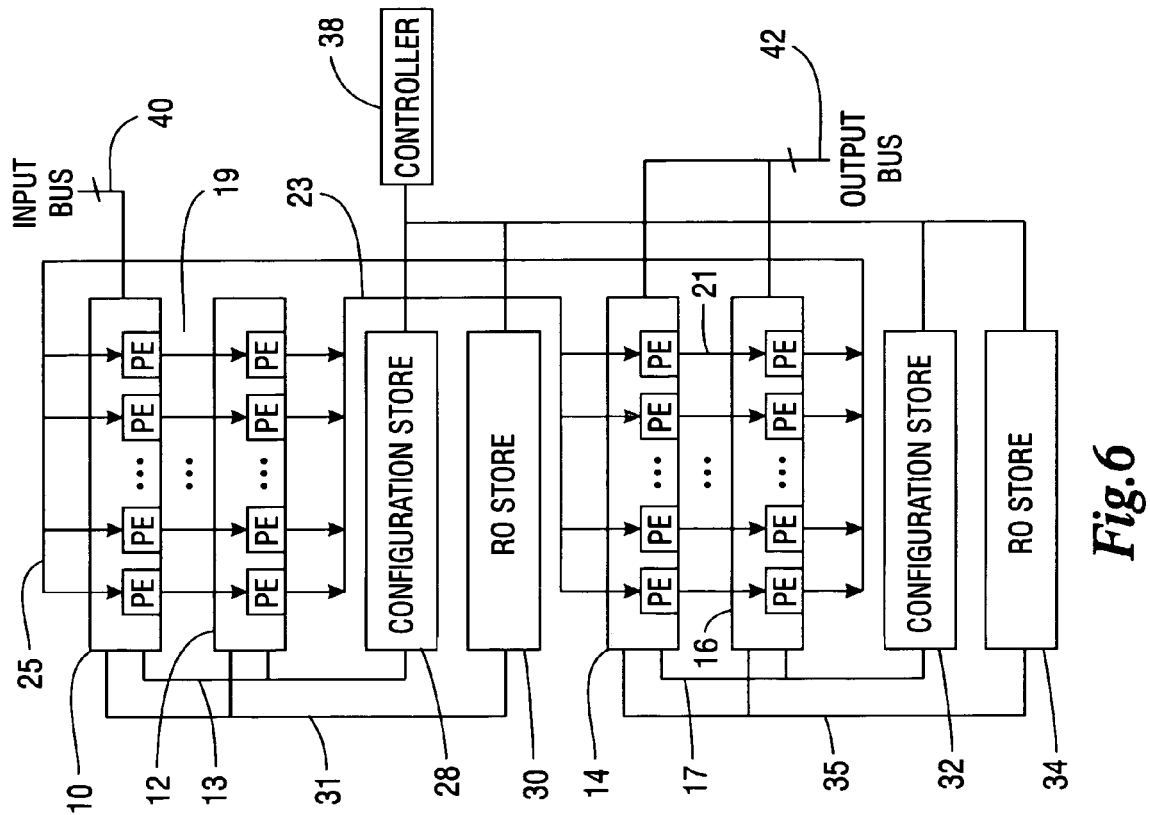
FIG. 6 is an abstraction of a reconfigurable fabric with four stripes interconnected according to the association shown in FIG. 5.

FIG. 6 is an abstraction of a reconfigurable fabric or device having four physical stripes 10, 12, 14, 16 interconnected according to the association option illustrated in FIG. 5. A configuration store (memory device) 28 is provided for storing virtual stripes 0, 1, 4, 5 and for configuring physical stripes 10, 12 through partially global bus 13. It is possible in some computations or applications that a virtual stripe may have to have some state value, stored in a register in the pass register file, restored from the last time that virtual stripe was configured in the fabric. In that case, an RO store (memory device) 30 is provided for storing the necessary value from the last instance, and providing that value to the next instance of a physical stripe through a bus 31. Similarly, a configurations store 32 configures physical stripes 14, 16 with virtual stripes 2, 3, 6, 7 through partially global bus 17. RO store 34 provides the values, as needed, to physical stripes 14, 16 through an RO bus 35.

The configuration store 28, RO store 30, configuration store 32, and RO store 34 are responsive to a controller 38. The controller 38 provides two major functions, managing the configuration and managing data. Those of ordinary skill in the art will recognize that the function of the controller 38 may be provided by a plurality of individual controllers. A detailed explanation of configuration management and data management is provided in Schmit, et al, "Managing Pipeline-Reconfigurable FPGAs" published in ACM 6$^{th}$ International Symposium on FPGAs, February 1998, the entirety of which is hereby incorporated by reference. The reader desiring more details on the tasks performed by controller 38 is referred to the above-identified article.

Completing the description of FIG. 6, it is seen that the physical stripe 10 is the only physical stripe which may be configured with the first virtual stripe 0. As a result, only physical stripe 10 is connected to an input bus 40. Output bus 42 services physical stripes 14, 16. It is possible that the four stripe fabric of FIG. 6 may be used to implement a method having less than eight virtual stripes, such as a process having five virtual stripes. In that case, the fifth virtual stripe, which in configured in physical stripe 12, will have the final output of the process. However, the physical stripe 12 is not serviced by the output bus 42. It is therefore necessary to configure physical stripe 14 with a null configuration. The purpose of the null configuration is to allow the final output produced by physical stripe 12 (virtual stripe 5) to propagate through physical stripe 14 to the output bus 42 without any change of state in the final output signal. It is possible that more than one physical stage may need to be configured with a null configuration to allow the output to propagate to a physical stripe serviced by an output bus. The null configuration may be written to a physical stripe like any other configuration, e.g. through a configuration word written to a physical stripe in a single clock cycle.

Figure 7:
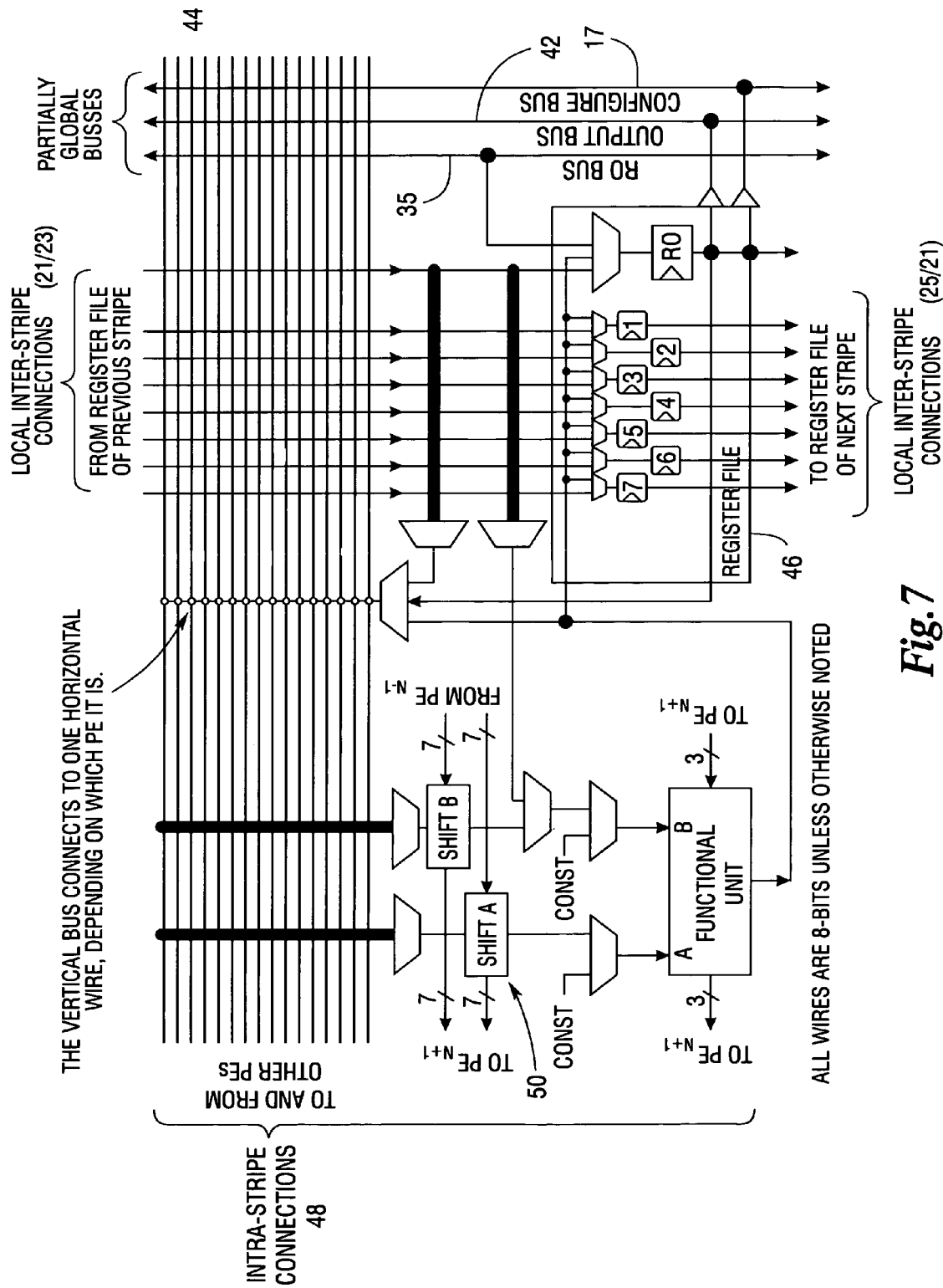
FIG. 7 is a block diagram of an example of a processing element (PE) that may be used in conjunction with the reconfigurable fabric shown in FIG. 6.

FIG. 7 is a block diagram of an example of a processing element 44 that may be used in conjunction with the reconfigurable fabric shown in FIG. 6. More specifically, the PE 44 shown in FIG. 7 may be implemented in one of the physical stripes 14, 16. A similar PE could be used in physical stripes 10, 12, but such PEs would not be service by the output bus 42, and PEs in physical stripe 10 would be serviced by the input bus 40.

Through the local inter-stripe connections, PEs can access operands from registered outputs of the previous stripe. Through the intra-stripe connections, PEs can access registered or unregistered outputs of the other PEs in the same stripe. A pass register file 46 facilitates efficient, local, inter-stripe connections. A program can write the ALU's output to any of the registers in the pass register file 46. If the ALU does not write to a particular register, that register's value will come from the value in the previous stripe's corresponding pass register. Thus, data values move laterally within a stripe via the intra-stripe connections 48. Additionally, a shifter 50 in each PE shifts its inputs B–1 bits to the left. Thus, the fabric can handle the data alignments necessary for word-based arithmetic. Additional details regarding the construction and operation of the PEs may be found in Schmit, et al, "PipeRench: a virtualized programmable data path in 0.18 Micron Technology", in *Proceedings of the IEEE Custom Integrated Circuits Conference* (CICC), 2002, the entirety of which is hereby incorporated by reference.

Figure 8:
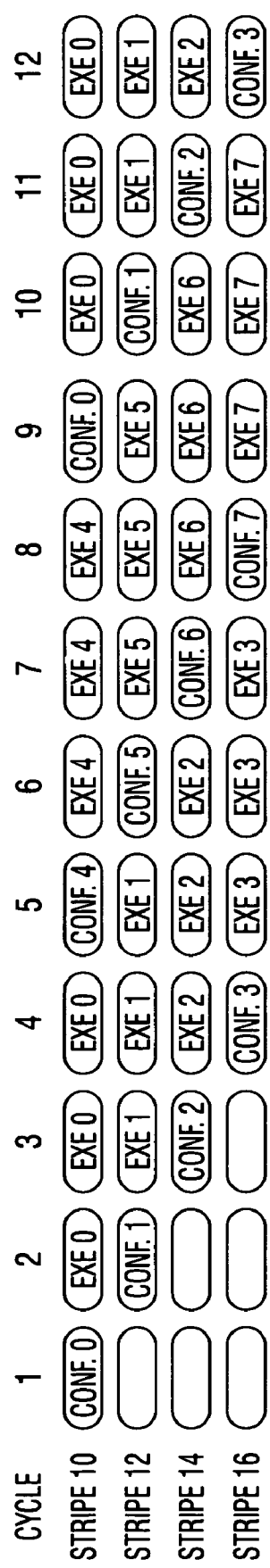
FIG. 8 illustrates using the four stripe fabric of FIG. 6 to implement a process requiring eight stripes.

FIG. 8 illustrates using the four stripe fabric of FIG. 6 to implement a process requiring eight stripes. FIG. 8 illustrates how each physical stage is configured, and when each physical stage is executing for twelve cycles. The reader desiring additional information on the operation of such reconfigurable fabrics is directed to Schmit, "PipeRench: a reconfigurable, architectural and compiler", IEEE Computer, pages 70-76 (April 2000), the entirety of which is hereby incorporated by reference.

While the present invention has been described in connection with preferred embodiments thereof, those of ordinary skill in the art will recognize that many modifications and variations are possible. For example, reconfigurable devices having more than four physical stripes, implementing more than eight virtual stripes, using ALUs with smaller or larger bitwidths, different operators, and connected in a pipelined or ring configuration are encompassed by the present invention. The architecture and exemplary PE illustrated and discussed above are presented for purposes of illustrating the invention, and are not intended to imply that the illustrated architecture and exemplary PE are the only embodiments for carrying out the present invention. The present invention is intended to be limited only by the following claims and not by the foregoing description.

What is claimed is:

1. A method of configuring a plurality of processing elements arranged in stripes, comprising:
  configuring either of at least two physical stripes with a virtual stripe from a first set of virtual stripes using a first partially global bus;
  configuring either of at least two additional physical stripes with a virtual stripe from a second set of virtual stripes using a second partially global bus distinct from said first partially global bus, said first and second sets of virtual stripes being disjoint; and
  wherein said physical stripes are arranged to form a pipelined processing fabric.

2. The method of claim 1 wherein said configuring either of said at least two physical stripes and said configuring either of said at least two additional physical stripes comprises writing a configuration word to each of the said physical stripes from a configuration memory.

3. The method of claim 2 wherein said writing of a configuration word to a physical stripe is performed in one clock cycle.

4. The method of claim 1 additionally comprising the step of maintaining a table of the next virtual stripe to be configured on each physical stripe.

5. The method of claim 1 wherein one of said physical stripes is configured with a null configuration to enable the output of a previous physical stripe to pass through the null configured physical stripe without any change of state of the output.

6. A method of associating virtual stripes to physical stripes in a device of the type wherein a plurality of processing elements are arranged in stripes, said method comprising:
  associating a first set of virtual stripes with at least two physical stripes using a first partially global bus;
  associating a second set of virtual stripes with at least two additional physical stripes, using a second partially global bus distinct from said first partially global bus, said first and second sets of virtual stripes being disjoint; and
  wherein said physical stripes or arranged to form a pipelined processing fabric.

7. A reconfigurable device, comprising:
  a controller;
  a memory responsive to said controller configured to maintain a mapping between physical stripes and virtual stripes;
  a plurality of processing elements arranged in said physical stripes;
  a plurality of intra-stripe connections for connecting processing elements within a stripe;
  a plurality of local inter-stripe connections for connecting the output of one stripe to the input of another stripe;
  a plurality of global inter-stripe connections for connecting at least one but less than all of the physical stripes to said memory; and
  an input bus and an output bus, each connected to at least one physical stripe.

8. The device of claim 7, wherein said output bus is connected to a plurality of physical stripes all interconnected by a single global inter-stripe connection.

9. The device of claim 7 additionally comprising a restore bus for connecting at least certain of said stripes to said memory.

10. The device of claim 9 additionally comprising a restore memory and wherein said restore bus connects at least certain of said stripes to said restore memory.

* * * * *

UNITED STATES PATENT AND TRADEMARK OFFICE
CERTIFICATE OF CORRECTION

PATENT NO. : 7,263,602 B2
APPLICATION NO. : 10/222645
DATED : August 28, 2007
INVENTOR(S) : Herman Schmit It is certified that error appears in the above-identified patent and that said Letters Patent is hereby corrected as shown below:

On the Title Page (56) Other Publications Page 2, Line 9, after "Pittsburgh" insert --PA, SETH C. GOLDSTEIN, Department of Computer Science, Carnegie Mellon University, Pittsburgh, PA, 2000, pages 129-145, Kluwer Academic Publishers, Printed in the Netherlands.--.

Column 1, Line 30, delete "long" and substitute therefore --longer--.

Column 5, Line 25, delete "service" and substitute therefore --serviced--.

Column 6, Line 48, delete "or" and substitute therefore --are--.

Signed and Sealed this

Twenty-seventh Day of May, 2008

JON W. DUDAS
*Director of the United States Patent and Trademark Office*